United States Patent [19]

Altman et al.

[11] Patent Number: 4,945,682
[45] Date of Patent: Aug. 7, 1990

[54] PLASTIC MOTOR VEHICLE DOOR

[75] Inventors: Gary F. Altman, E. Lansing; Mark A. Cunningham, Mason, both of Mich.

[73] Assignee: General Motors Corporation, Detroit, Mich.

[21] Appl. No.: 445,248

[22] Filed: Dec. 4, 1989

[51] Int. Cl.$^5$ ............................................. B60J 5/04
[52] U.S. Cl. ....................................... 49/502; 296/146
[58] Field of Search ...................... 49/502, 501, 503; 296/146, 202

[56] References Cited

U.S. PATENT DOCUMENTS

| | | | |
|---|---|---|---|
| 4,711,052 | 12/1987 | Maeda et al. | 49/502 |
| 4,843,762 | 7/1989 | Grier et al. | 49/502 X |
| 4,860,496 | 8/1989 | Hellriegel | 49/502 |
| 4,866,883 | 9/1989 | Brown et al. | 49/502 |

*Primary Examiner*—Philip C. Kannan
*Attorney, Agent, or Firm*—Charles E. Leahy

[57] ABSTRACT

A vehicle door includes an outer panel and an inner panel of molded synthetic resin construction. The inner panel has a structural lower portion concealed beneath the outer panel and an upper portion integral with the lower portion and defining a window frame surrounding a window opening. A tubular reinforcement member of generally inverted U shape is embedded in the upper portion of the inner panel and has leg portions extending downwardly from the upper portion and embedded in the structural lower portion so that the structural lower portion connects the leg portions of the upper portion. The tubular member is a continuous hollow tube formed to have varying cross sectional shape along the continuous length to fit within the shape of the window frame. The synthetic resin of the upper portion is a reinforced reaction injection molded material providing a finished surface for painting and the synthetic resin of the lower portion is a structural reaction injection molded material providing relatively high strength and having a glass fiber mat embedded therein to span between the legs of the tubular member and facilitate bonding between the resin materials of the upper and lower portions.

4 Claims, 40 Drawing Sheets

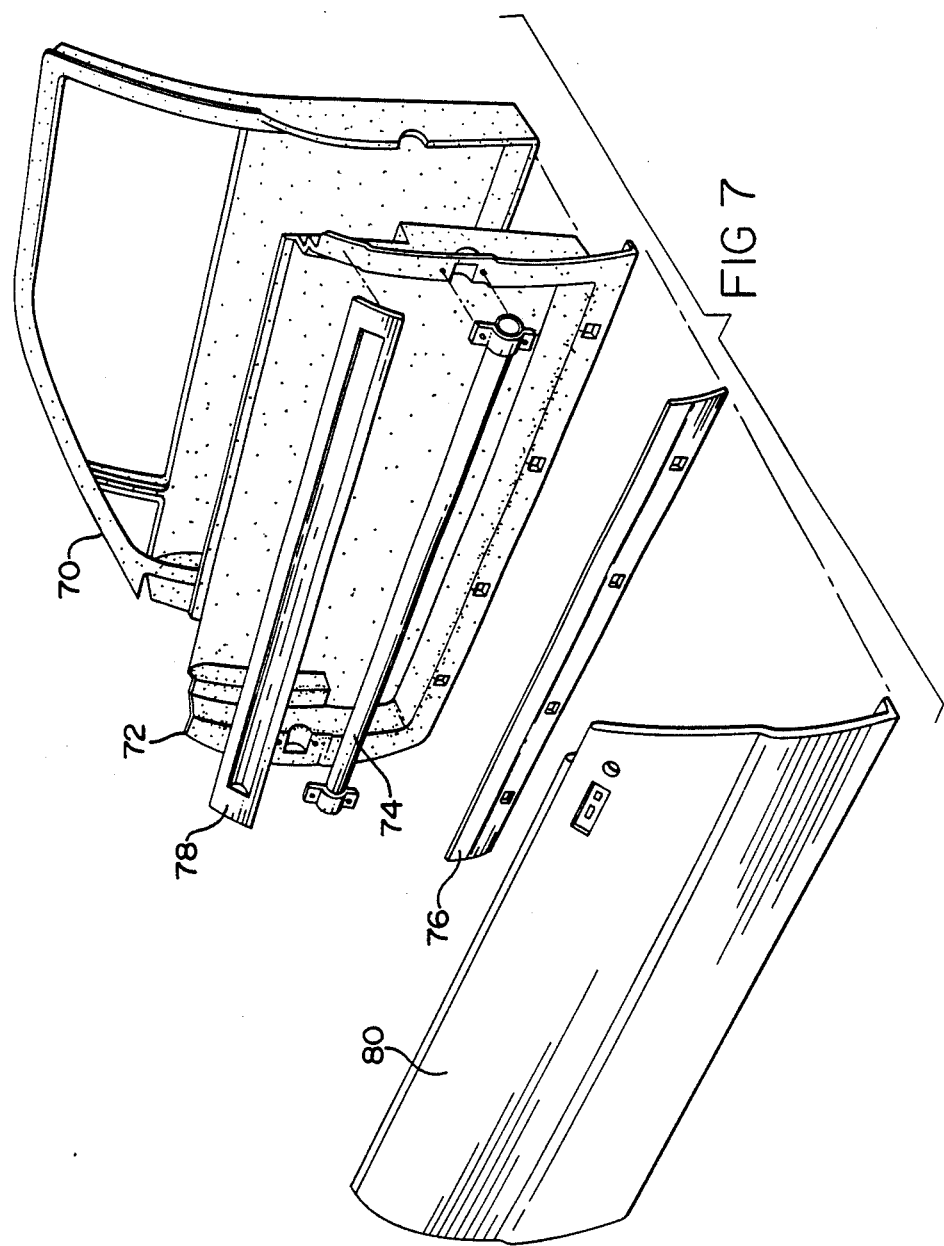

PLASTIC MOTOR VEHICLE DOOR

The present invention relates to motor vehicle door and more particularly to a door including a composite plastic structural inner panel having an integral reinforced window frame.

BACKGROUND OF THE INVENTION

It is known to construct motor vehicle doors from an inner panel and an outer panel which are spaced apart to define a cavity in which window regulators, door latches and other mechanisms are mounted. Such doors typically have a window frame which surrounds a window opening.

Prior patents have disclosed door constructions in which either or both of the panels were constructed of molded synthetic resin plastic parts.

One shortcoming of the use of plastics in the construction of vehicle doors is that the plastic material has somewhat limited strength which necessitates the use of metal or glass fiber reinforcements.

Another shortcoming of the use of plastic in vehicle door is that plastic materials which have reinforcements therein tend to provide a poor surface finish for subsequent painting, while materials which have high surface quality for subsequent painting may have insufficient strength for the structural requirements of the vehicle door.

The present invention provides a new and improved vehicle door construction uniquely constructed and configured to provide both high strength and good surface finish for subsequent painting.

According to the invention, a vehicle door includes an outer panel and an inner panel of molded synthetic resin construction. The inner panel has a structural lower portion concealed beneath the outer panel and an upper portion integral with the lower portion and defining a window frame surrounding a window opening. A tubular reinforcement member of generally inverted U shape is embedded in the upper portion of the inner panel and has leg portions extending downwardly from the upper portion and embedded in the structural lower portion so that the structural lower portion connects the leg portions of the upper portion. The tubular member is a continuous hollow tube formed to have varying cross sectional shape along the continuous length to fit within the shape of the window frame. The synthetic resin of the upper portion is a reinforced reaction injection molded material providing a finished surface for painting and the synthetic resin of the lower portion is a structural reaction injection molded material providing relatively high strength and having a glass fiber mat embedded therein to span between the legs of the tubular member and facilitate bonding between the resin materials of the upper and lower portions.

Accordingly, the object, feature, and advantage of the invention resides in the provision of a new and improved plastic vehicle door including an inner panel having a tubular reinforcement member of inverted U-shape embedded in the upper portion to define a window opening and having leg portions extending downwardly and embedded in a structural lower portion.

Another feature, object, and advantage of the invention resides in the provision of a tubular member embedded in the window frame forming portion of a molded plastic door panel and having varying cross sectional shape along the length thereof to fit within the cross section of the window frame.

A still further feature, object, and advantage of the invention resides in the provision of an inner panel for a vehicle door having an integrally molded upper portion defining a window opening and providing a finished surface for painting and having a lower portion of structural molded material with a glass fiber mat embedded therein.

A still further feature, object, and advantage of the invention resides in the provision of a vehicle door panel comprised of upper and lower portions with a tubular metal reinforcement embedded in the upper portion and glass fiber mat embedded in the lower portion and spanning between the upper and lower portions and extending between the spaced apart legs of the tubular reinforcement member.

BRIEF DESCRIPTION OF THE DRAWINGS

These and other features, objects and advantages of the invention will become apparent upon consideration of the description of the preferred embodiment and the appended drawings in which:

FIG. 7 is an exploded perspective view of a second embodiment of the plastic door of this invention.

DESCRIPTION OF THE PREFERRED EMBODIMENT

Figure 1:
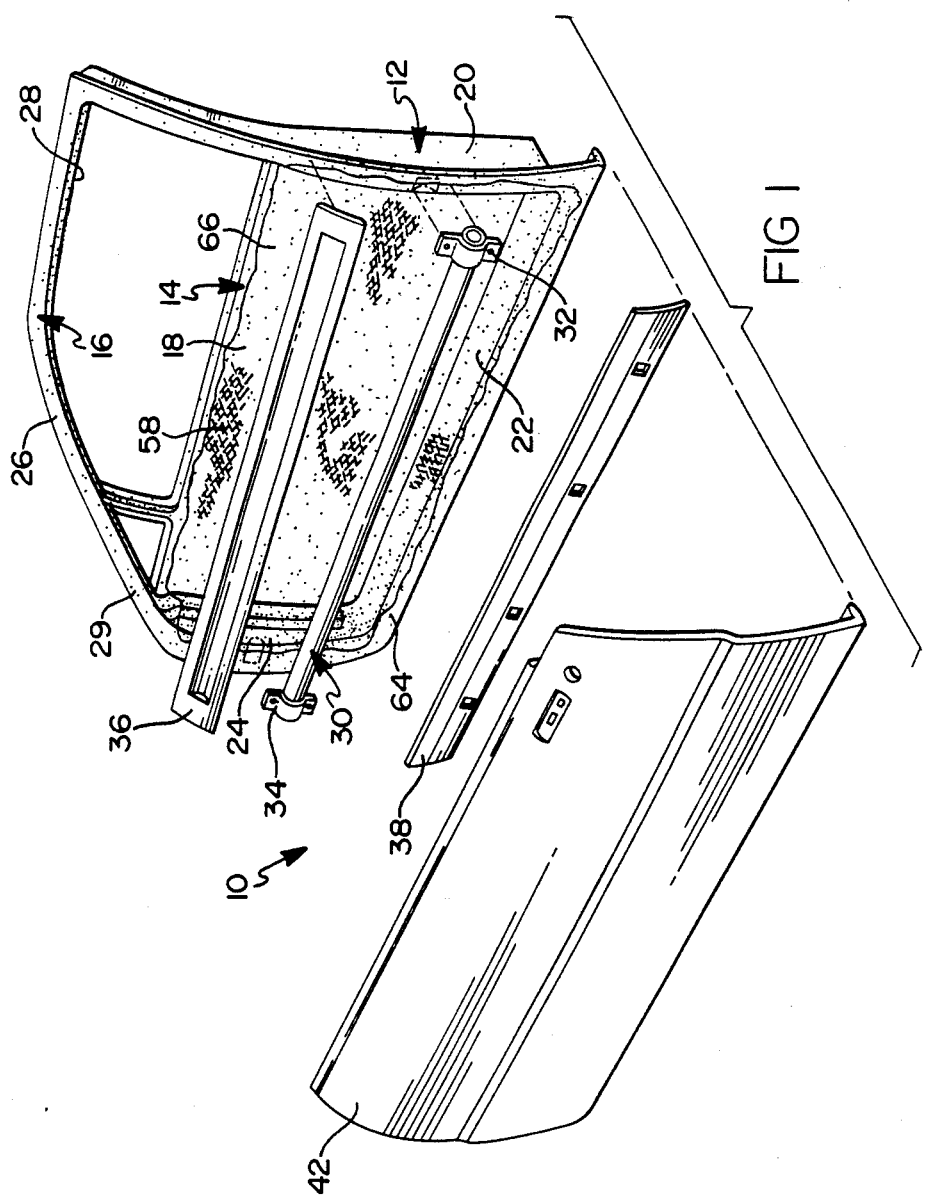
FIG. 1 is an exploded view of a plastic vehicle door according to the present invention.

Referring to FIG. 1, it is seen that the vehicle door 10 includes a door inner panel 12 including a lower portion 14 and an upper portion 16. The lower portion 14 includes a generally planar panel 18 having an integral rearward wall 20, lower wall 22 and forward wall 24 which project laterally from the planar portion 18. The upper portion 16 of the inner panel 12 is a window frame 26 which extends from the forward wall 24 rearwardly to the rear wall 20 and cooperates with the planar portion 18 to define window opening 28. The door inner panel 12 also includes a flange lip 29 which extends continuously around the perimeter of the window frame 26, and the rearward wall 20, lower wall 22 and forward wall 24.

The door inner panel 20 of FIG. 1 is of molded synthetic plastic resin construction which is injection molded as will be further described hereinafter. The door 10 of FIG. 1 also includes a side impact tube 30 having a rear end attached to the rearward wall 20 by bracket 32 and a forward end attached to the forward wall 24 by a bracket 34. In addition, an upper reinforcement bar 36 and a lower reinforcement bar 38 extended between the rearward wall 20 and forward wall 24 and are suitably attached by adhesives or fasteners.

A door outer panel 42, also preferably of a molded synthetic plastic resin construction is provided for attachment over the outside of the flange lip 29 of inner panel 12 and forms the outer surface of the door. The door hardware such as window regulators, door latches, door handles, and other components are attached to the inner panel 12 before the outer panel 42 is secured to the inner panel 12.

Figure 2:
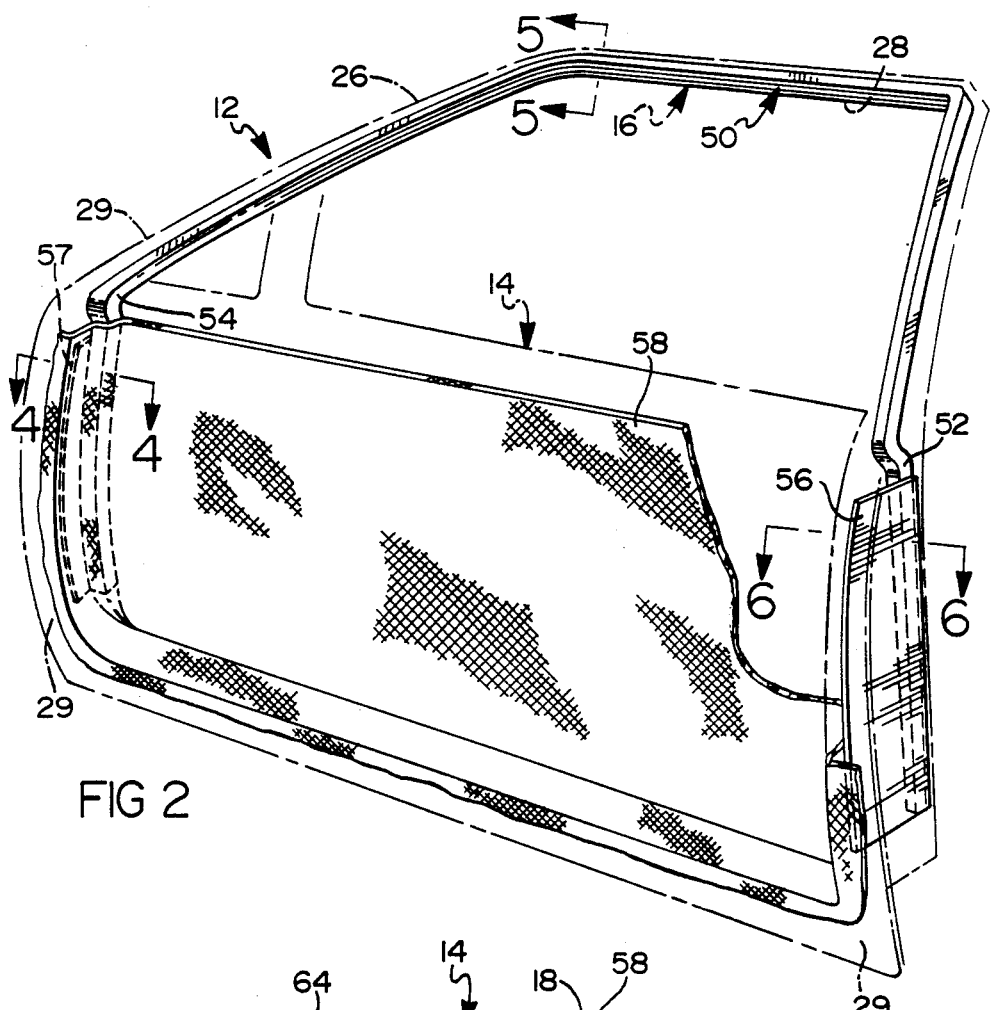
FIG. 2 is a perspective view of the door inner panel showing the tubular member with a sheet of glass fiber mat overlying the legs or tubular member prior to the injection of the resin materials.

Referring to FIG. 2, a tubular reinforcing member 50 is bent to an inverted U shape and has a rearward leg 52 and a forward leg 54 which extend downwardly. A mounting plate 56 is welded to the rearward leg 52 and facilitates the subsequent attachment of the door latch to the door. A mounting plate 57 is welded to the forward leg 54 and facilitates the attachment of the door hinges to the door. The tubular reinforcing member 50 is a continuous metallic hollow tube which is formed to have varying cross sectional shape along the continuous length thereof. Reference may be had to U.S. Pat. No. 4,567,743 for a discussion of the method by which such formed tubing is manufactured. The tubing is commercially available from TI Automotive Division of TI Canada, Inc.

Figure 4:
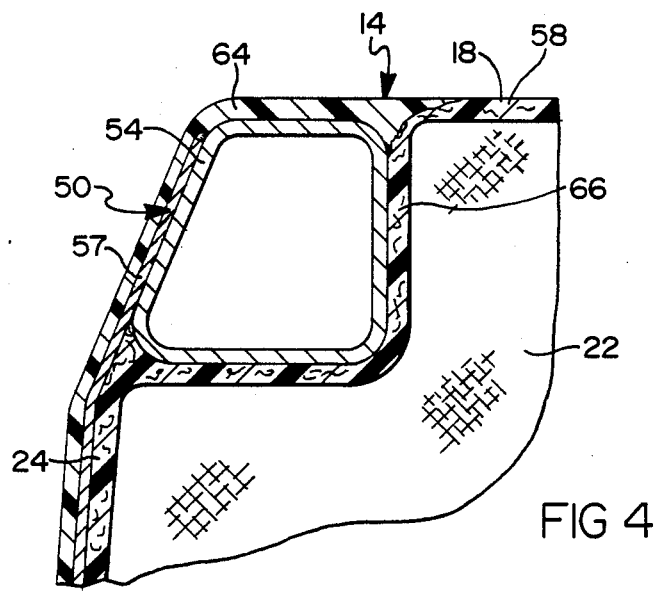
FIG. 4 is a sectional view taken in the direction of arrows 4—4 of FIG. 2.
Figure 3:
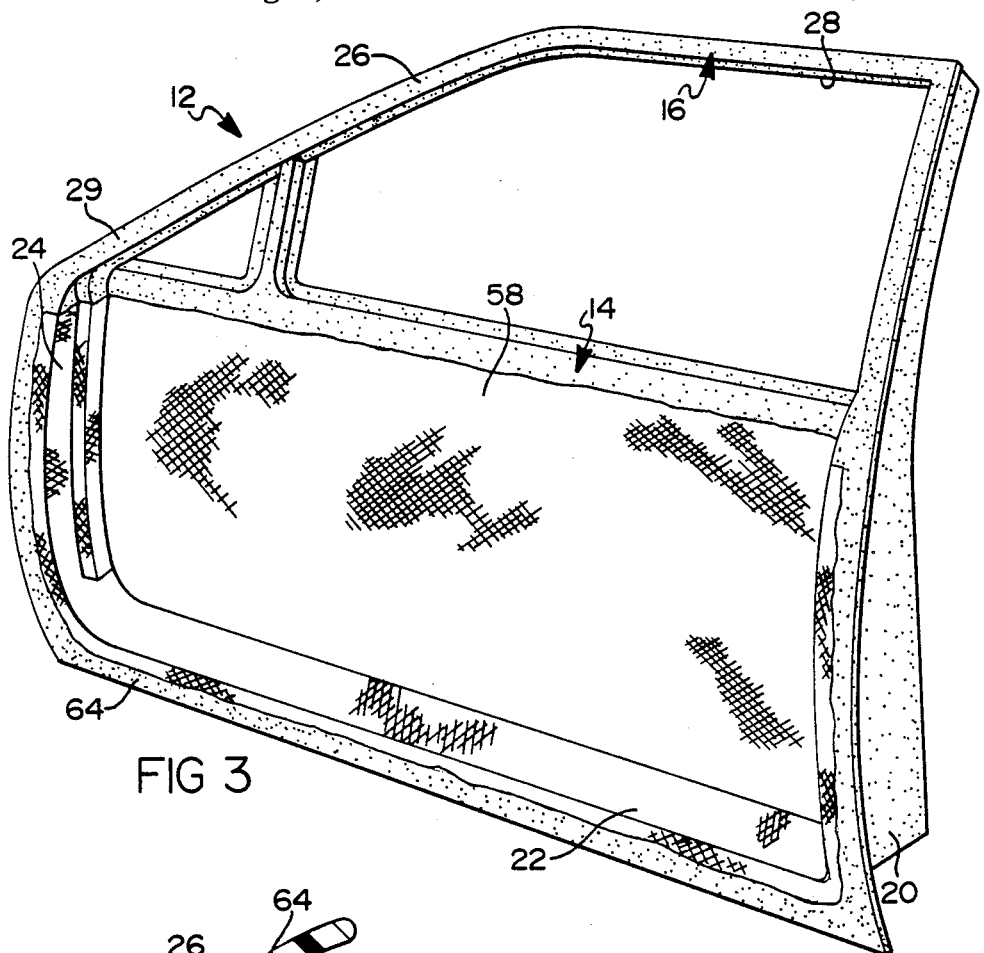
FIG. 3 is a perspective view of the door inner panel shown as molded.
Figure 5:
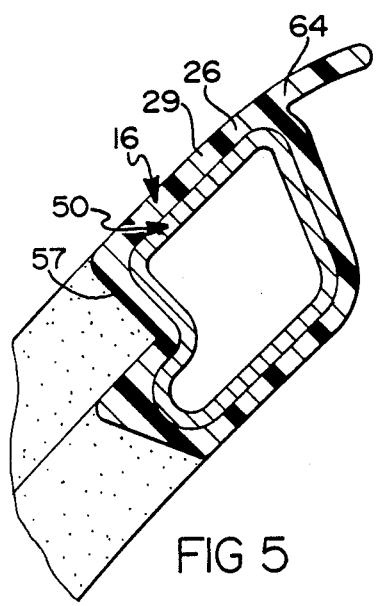
FIG. 5 is a sectional view taken in the direction of arrows 5—5 of FIG. 2.
Figure 6:
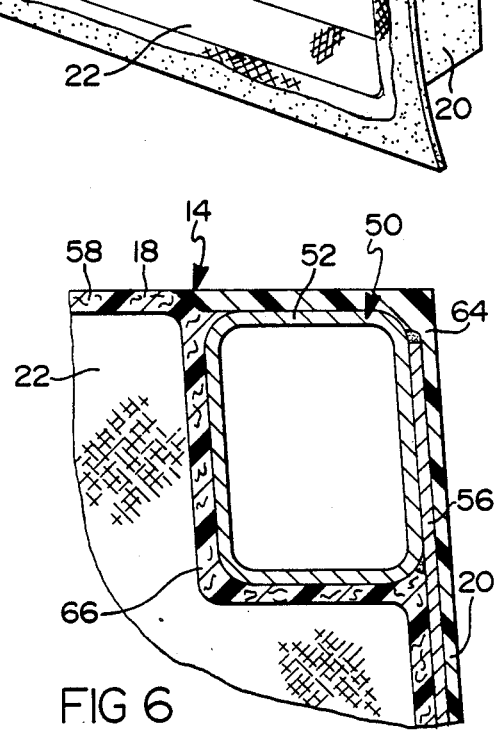
FIG. 6 is a sectional view taken in the direction of arrows 6—6 of FIG. 2.

As seen in FIG. 4 the forward leg 54 of the tubular reinforcing member 50 has a trapezoidal cross sectional shape which fits advantageously within the cross section of the door at the leading edge of the door. As seen in FIG. 5, the tubular reinforcing member 50 at window frame 26 has a complex cross section which facilitates the provision of a recess 57 for mounting a glass run channel. FIG. 6 shows the rectangular cross section of the rearward leg 52 of tubular reinforcing member 50 at the rear corner of the door.

In order to mold the door inner panel 12, the preformed tubular reinforcing member 50 is placed in a plastic injection mold. A sheet of woven glass fiber 58 is also placed in the mold. The sheet of woven glass fiber 58 is large enough to reach substantially the full expanse of the planar portion 18 of the inner panel 12 so that it reaches fore and aft and overlays the depending legs 52 and 54 of the tubular reinforcement member 50 as shown in FIG. 2. The sheet of woven glass fiber 58 also extends into the region of the rearward wall 20, lower wall 22 and forward wall 24, and part way into the region of the flange lip 29 as shown in FIG. 2.

A synthetic resin reaction injection molding material such as urethane or urea is injected into the mold via high pressure impingement mixing with isocyanate and polyol, and is preferably reinforced with chopped flaked glass fibers. This material is highly viscous and is injected into the region of flange lip 29. This reinforced reaction injection molded material RRIM, designated 64 in FIGS. 3, 4, 5 and 6, flows around the tubular member 50 and also flows around the entire periphery of the lower portion 14 of the door inner panel 12. Because this RRIM material is highly viscous, the RRIM material flows only a small distance into the region of the sheet of glass fiber 58, thereby bonding with the edge of the sheet or woven glass fiber 58.

Immediately after the injection of the RRIM material, a structural reaction injection molded material (SRIM) is injected into the mold at the lower portion 14 to complete the filling of the mold cavity. This SRIM material, designated 66 in FIGS. 1, 4, and 6, is less viscous than the RRIM material and flows throughout the sheet of woven glass cloth 58 and melds into the earlier injected RRIM material.

After the door is removed from the mold, any flash may be easily removed from the molding as the RRIM material 64 extends all around the flange lip 29 of the door inner panel 12 and is relatively easier to cut than is the SRIM material 66. Referring again to FIG. 1 will be appreciated that the RRIM material is painted to match the exterior color of the car and becomes the appearance surface of the door at the window frame 26.

Referring to FIGS. 4 and 6 it is noted that the RRIM material 64 and the SRIM material 66 are shown as separate moldings, however, in actual practice it has been found that the sequentially injected materials will have substantially flowed together prior to cure the RRIM material so that both a mechanical and chemical bond acts between the two materials.

The lower portion 14 of the door, which is comprised of SRIM materials, is structurally strong and dimensionally stable. The lower portion 14 of SRIM need not be painted as it is concealed beneath the outer panel 42. The embedment of the sheet of woven glass fiber 58 within the lower portion 14 ridgidifies the lower portion and also spans between the rearward leg 52 and forward leg 54 to substantially strengthen the door by maintaining the spacing between the legs.

FIG. 7 shows another embodiment of the invention in which the door inner panel assembly is comprised of a inner panel 70 and a component tray 72, which are separately constructed of molded synthetic plastic resin and then bonded or otherwise suitably fastened together. The side impact tube 74 and the lower reinforcement 76 and upper reinforcement 78 are suitably attached to the component tray 72. The window regulator would be attached to the component tray 72. The door outer panel 80 is attached to the component tray 72 after the other components have been attached Thus it is seen that the invention provides a new and improved vehicle body door comprised of reaction injected materials.

The embodiments of the invention in which an exclusive property or privilege is claimed are defined as follows:

1. A vehicle door comprising:
    an inner panel of molded synthetic resin construction and an outer panel, said inner panel having a structural lower portion concealed beneath the outer panel and an upper portion integral with the lower portion and defining a window frame surrounding a window opening, a tubular reinforcement member of generally inverted U-shape embedded in the upper portion of the inner panel and having leg portions extending downward from the upper portion and embedded in the structural lower portion so that the structural lower portion connects the leg portions of the upper portion.

2. A vehicle door comprising:
    an outer panel and an inner panel of molded synthetic resin construction, said inner panel having a structural lower portion concealed beneath the outer panel and an upper portion integral with the lower portion and defining a window frame surrounding a window opening, a tubular reinforcement member of generally inverted U-shape embedded in the upper portion of the inner panel and having leg portions extending downward from the upper portion and embedded in the structural lower portion so that the structural lower portion connects the leg portions of the upper portion, said tubular member being a continuous hollow tube formed to have varying cross-sectional shape along the continuous length.

3. A vehicle door comprising:

an outer panel and an inner panel of molded synthetic resin construction, said inner panel having a structural lower portion concealed beneath the outer panel and an upper portion integral with the lower portion and defining a window frame surrounding a window opening, a tubular reinforcement member embedded in the upper portion of the inner panel, said synthetic resin of the upper portion being a reinforced reaction injection molded material providing a finished surface and the synthetic resin of the lower portion being a structural reaction injected molded material providing relatively high strength and unfinished surface.

4. A vehicle door comprising:

an outer panel and an inner panel of molded synthetic resin construction, said inner panel having a structural lower portion concealed beneath the outer panel and an upper portion integral with the lower portion and defining a window frame surrounding a window opening, a tubular reinforcement member of generally inverted U-shape embedded in the upper portion of the inner panel and having leg portions extending downward from the upper portion and embedded in the structural lower portion so that the structural lower portion connects the leg portions of the upper portion, said tubular member being a continuous hollow tube formed to have varying cross-sectional shape along the continuous length, said synthetic resin of the upper portion being a reinforced reaction injection molded material providing a finished surface and the synthetic resin of the lower portion being a structural reaction injected molded material providing relatively high strength an unfinished surface, and a glass fiber mat spanning between the synthetic resins of the upper and lower portion and embedded therein to facilitate the bonding between the upper and lower portions.

* * * * *